United States Patent
Jorgensen

(10) Patent No.: US 8,596,412 B1
(45) Date of Patent: Dec. 3, 2013

(54) TABLET COMPUTER HOLDER AND SOUND DEFLECTING ASSEMBLY

(76) Inventor: Brett E. Jorgensen, Sioux Falls, SD (US)

(*) Notice: Subject to any disclaimer, the term of this patent is extended or adjusted under 35 U.S.C. 154(b) by 0 days.

(21) Appl. No.: 13/550,771

(22) Filed: Jul. 17, 2012

(51) Int. Cl.
*G10K 11/08* (2006.01)

(52) U.S. Cl.
USPC ............... 181/205; 455/575.1; 455/575.8; 206/320; 181/202

(58) Field of Classification Search
USPC ............ 455/575.1, 575.8; 181/177, 200, 201, 181/202, 205; 206/320; D14/440, 250, 251
See application file for complete search history.

(56) References Cited

U.S. PATENT DOCUMENTS

| | | | | |
|---|---|---|---|---|
| 7,197,140 B2* | 3/2007 | Asaro | ...................... | 379/433.03 |
| 8,028,794 B1 | 10/2011 | Freeman | | |
| 8,170,259 B2* | 5/2012 | Liu | .............................. | 381/365 |
| 8,177,111 B2* | 5/2012 | Yeh | ............................... | 224/571 |
| 8,320,597 B2* | 11/2012 | Griffin et al. | ................. | 381/339 |
| 2002/0009195 A1* | 1/2002 | Schon | .......................... | 379/454 |
| 2003/0184958 A1 | 10/2003 | Kao | | |
| 2006/0061950 A1 | 3/2006 | Richardson et al. | | |
| 2006/0226039 A1 | 10/2006 | Goradesky | | |
| 2011/0031287 A1 | 2/2011 | Le Gette et al. | | |
| 2011/0221319 A1 | 9/2011 | Law et al. | | |
| 2011/0226545 A1* | 9/2011 | Richardson et al. | ......... | 181/200 |
| 2013/0070948 A1* | 3/2013 | Lee et al. | ..................... | 381/334 |

FOREIGN PATENT DOCUMENTS

| | | |
|---|---|---|
| DE | 20300217 | 5/2003 |
| WO | WO2010151233 | 12/2010 |

* cited by examiner

*Primary Examiner* — Jeremy Luks

(57) ABSTRACT

A tablet computer holder and sound deflecting assembly includes a panel that has a top side, a bottom side, a first lateral edge, a second lateral edge, a first end edge and a second end edge. A perimeter wall is attached to the top side and is coextensive with a perimeter edge of the panel. The perimeter wall extends around a receiving space for receiving a tablet computer. The perimeter wall has an interior surface, an exterior surface and an upper surface. The top side has a channel therein and the channel has a plurality of arms therein in fluid communication with each other and extending from a central area of the panel and towards the perimeter wall. The perimeter wall has a plurality of sound notches therein extending into the upper and interior surfaces. Each of the arms is in fluid communication with one of the sound notches.

18 Claims, 10 Drawing Sheets

TABLET COMPUTER HOLDER AND SOUND DEFLECTING ASSEMBLY

BACKGROUND OF THE DISCLOSURE

Field of the Disclosure

The disclosure relates to electronic device holders and more particularly pertains to a new electronic device holder for holding a tablet computer in such a manner that the sounds emitted from the tablet computer are emitted outwardly from the holder in multiple directions.

SUMMARY OF THE DISCLOSURE

An embodiment of the disclosure meets the needs presented above by generally comprising a panel that has a top side, a bottom side, a first lateral edge, a second lateral edge, a first end edge and a second end edge. A perimeter wall is attached to the top side and is coextensive with a perimeter edge of the panel. The perimeter wall extends around a receiving space for receiving a tablet computer. The perimeter wall has an interior surface, an exterior surface and an upper surface. The top side has a channel therein and the channel has a plurality of arms therein in fluid communication with each other and extending from a central area of the panel and towards the perimeter wall. The perimeter wall has a plurality of sound notches therein extending into the upper and interior surfaces. Each of the arms is in fluid communication with one of the sound notches to release sounds from the table computer outwardly away from the panel in multiple directions.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
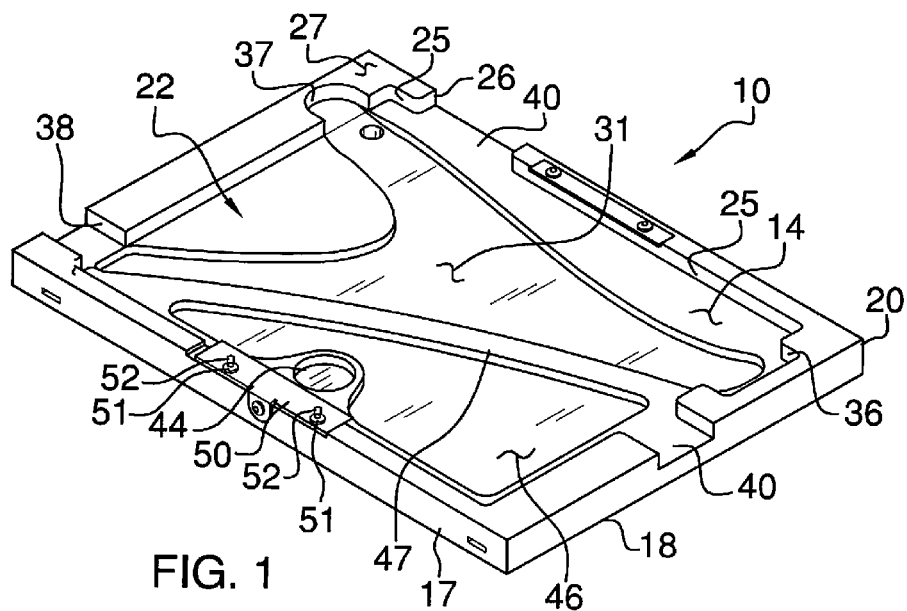
FIG. 1 is a top perspective view of a tablet computer holder and sound deflecting assembly according to an embodiment of the disclosure.
Figure 2:
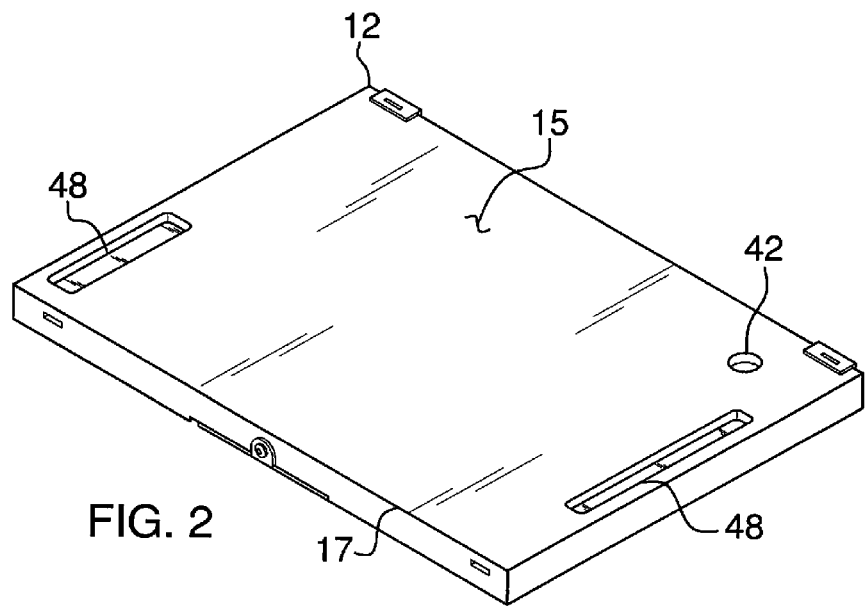
FIG. 2 is a bottom perspective view of an embodiment of the disclosure.
Figure 3:
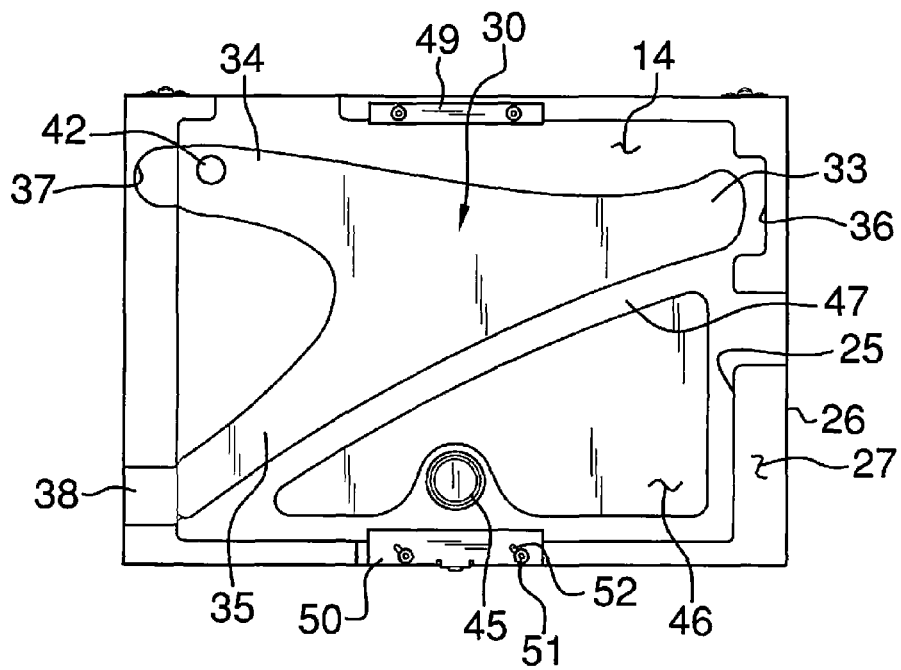
FIG. 3 is a top view of an embodiment of the disclosure.
Figure 4:
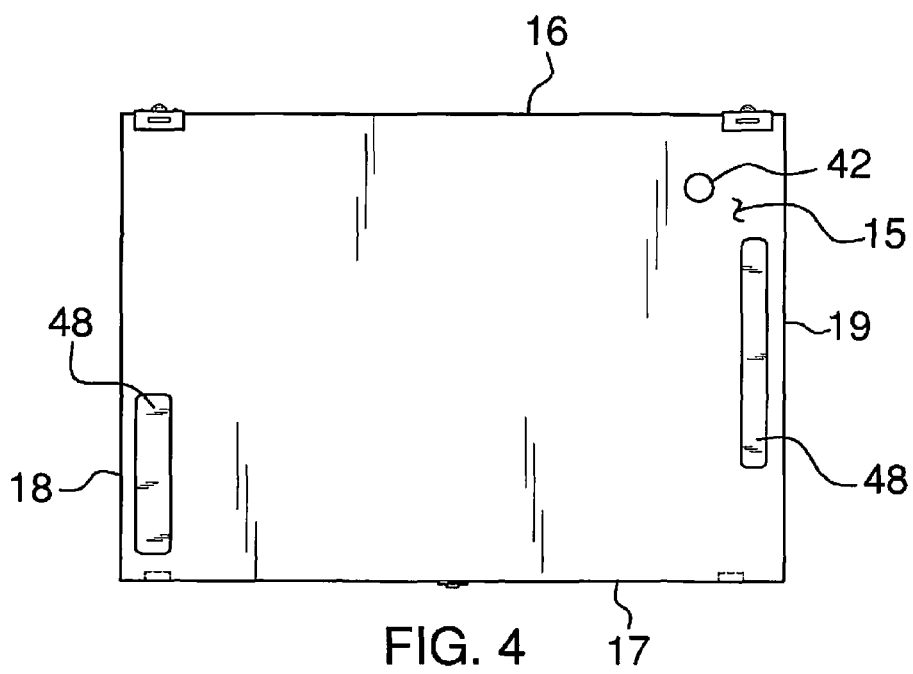
FIG. 4 is a bottom view of an embodiment of the disclosure.
Figure 5:
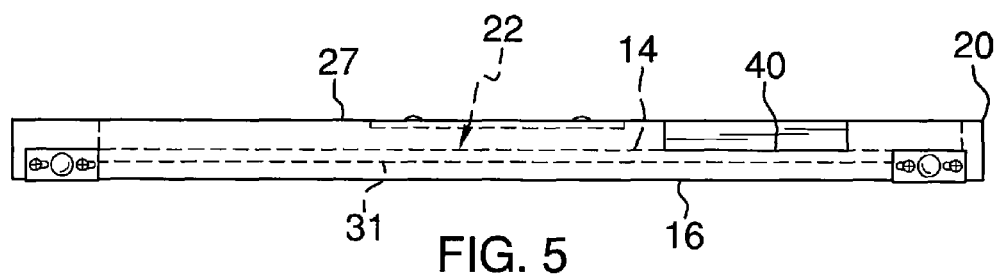
FIG. 5 is a right side view of an embodiment of the disclosure.
Figure 6:
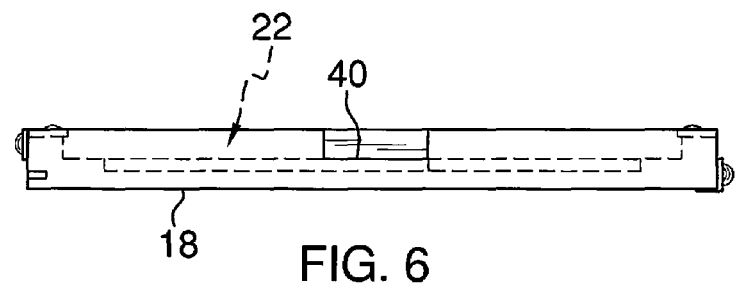
FIG. 6 is an end view of an embodiment of the disclosure.
Figure 7:
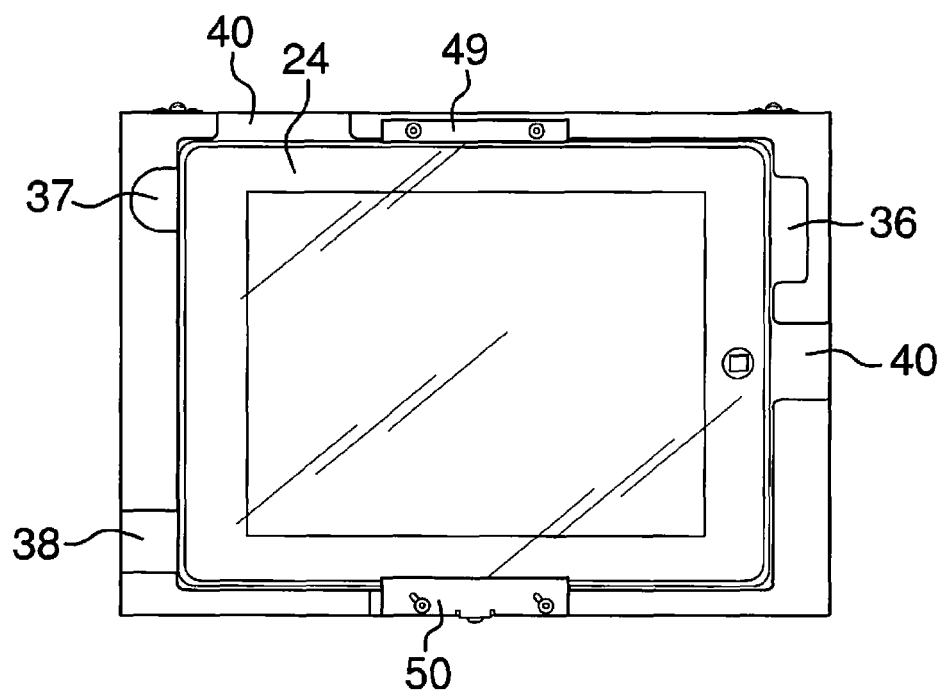
FIG. 7 is a top in-use view of an embodiment of the disclosure.
Figure 8:
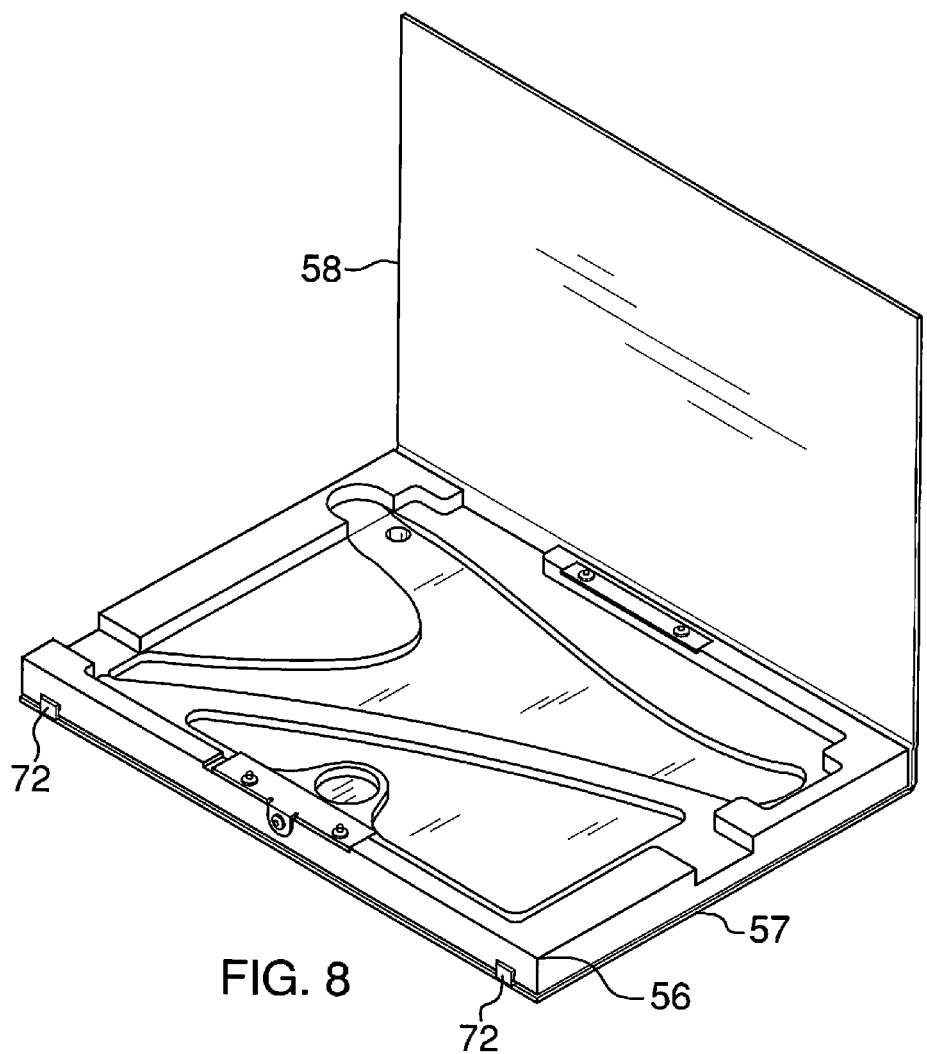
FIG. 8 is a top perspective view of an embodiment of the disclosure.
Figure 9:
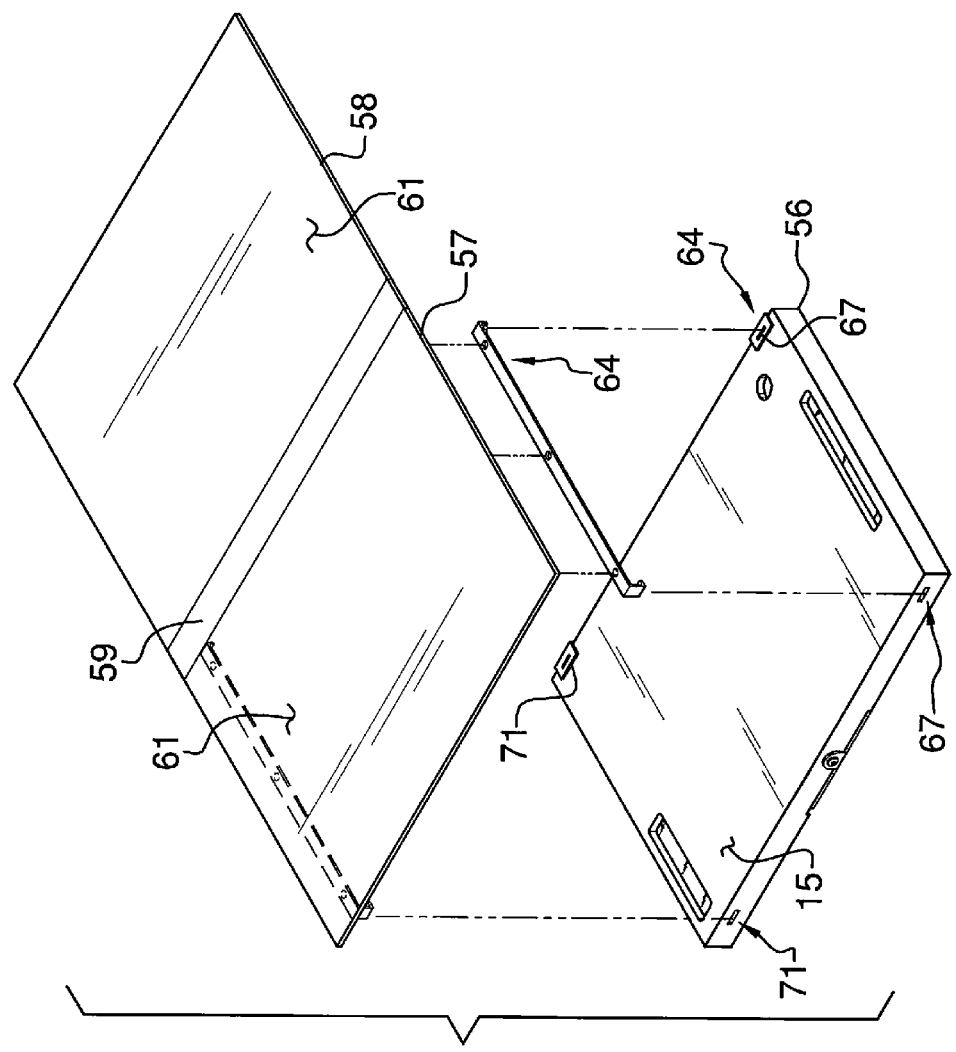
FIG. 9 is an exploded rear perspective view of an embodiment of the disclosure.
Figure 10:
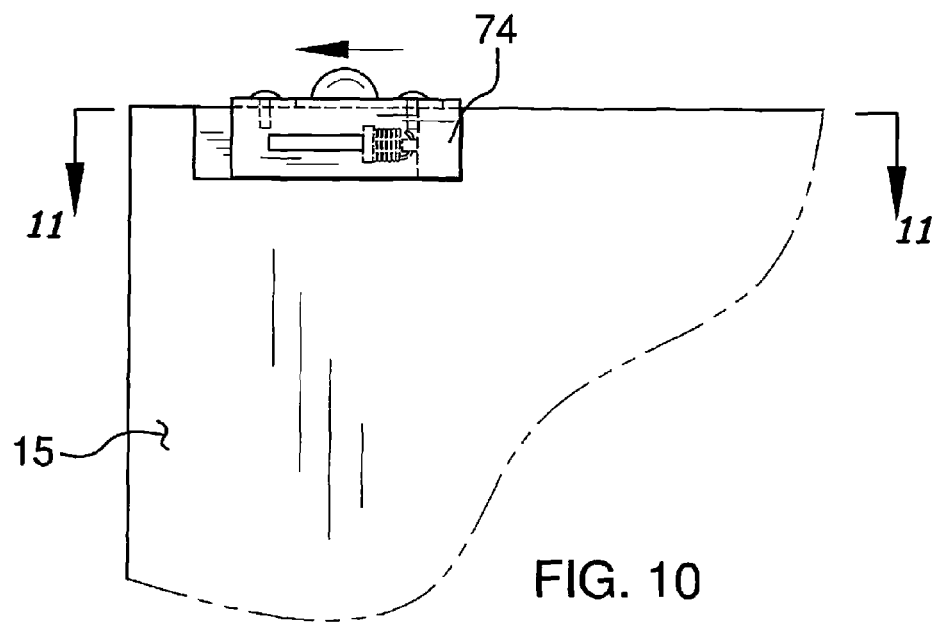
FIG. 10 is a bottom broken view of an embodiment of the disclosure.

With reference now to the drawings, and in particular to FIGS. 1 through 14 thereof, a new electronic device holder embodying the principles and concepts of an embodiment of the disclosure and generally designated by the reference numeral 10 will be described.

As best illustrated in FIGS. 1 through 14, the tablet computer holder and sound deflecting assembly 10 generally comprises a panel 12 that has a top side 14, a bottom side 15, a first lateral edge 16, a second lateral edge 17, a first end edge 18 and a second end edge 19. The terms "top," "bottom," etc. are being used for illustrative purposes only as it should be understood that the panel 12 may be orientated in any desired direction. A perimeter wall 20 is attached to the top side 14 and is coextensive with a perimeter edge of the panel 12. The perimeter wall 20 extends around a receiving space 22 for receiving a tablet computer 24. The term "tablet computer" is generally defined as a mobile computer having a touch screen and which is typically employs a virtual keyboard as opposed to a physical keyboard, though physical keyboards are typically capable of being coupled to such tablets. One example of a tablet computer would be an iPad manufactured by Apple Inc. with headquarters located at 1 Infinite Loop, Cupertino, Calif. It should be understood that while the assembly 10 could be used with a mobile phone, the assembly 10 provides for greater protection of the tablet computer than would be required by a mobile phone. The perimeter wall 20 has an interior surface 25, an exterior surface 26 and an upper surface 27. The panel 12 and the perimeter 20 wall may comprise a wood material and the perimeter wall 20 and the panel 12 are non-removably coupled to each other. More particularly, the panel 12 and perimeter wall 20 may be formed out of a single piece of wood material (or portions of wood material bonded together) with a router as would be advantageous with computer numeric control (CNC) tool techniques. Wood materials may be beneficial over other materials based on the ability of wood to provide higher quality sound reflection and amplification of bass tones.

The top side 14 of the panel 12 has a channel 30 extending downwardly therein but which is spaced from the bottom side 16. The receiving space 22 is defined as between the top side 14 and the upper surface 27 such that the tablet computer 24 will be spaced from a bottom 31 of the channel 30 such that sound may travel under the tablet computer 24 and through the channel 30. The channel 30 includes a plurality of arms and in particular a first arm 33, a second arm 34 and a third arm 35 in fluid communication with each other and extending from a central area of the panel 12 and towards the perimeter wall 20. A central portion of the channel 30 may be positioned nearer to the first lateral edge 16 than to the second lateral edge 17. More specifically, the first arm 33 may extend toward the first end edge 18 and be positioned nearer the first lateral edge 16 than the second lateral edge 17. The perimeter wall 20 has a first sound notch 36 therein in fluid communication with the first arm 33 and extending into the interior 25 and upper 27 surfaces. The second arm 34 may extend toward the second end edge 19 and be positioned nearer the first lateral edge 16 than the second lateral edge 17. The perimeter wall 20 has a second sound notch 37 therein in fluid communication with the second arm 34 and extending into the interior 25 and upper 27 surfaces. The third arm 35 may extend toward the second end edge 19 and be positioned nearer the second lateral edge 17 than the first lateral edge 16. The perimeter wall 20 has a third sound notch 38 therein in fluid communication with the third arm 35 and extending into the interior 25 and upper 27 surfaces. The third sound notch 38 may further extend through the exterior surface 26. The first 36, second 37 and third 38 sound notches allow sound from the tablet computer 24 to escape the channel 30. More particularly, at least the first 36 and second 37 sound notches may retain the adjacent exterior surfaces 26 intact to facilitate deflection of the sound upwardly from the top side 14.

Some of the sound notches, such as the third sound notch 38, may further include the exterior surface 26 removed to allow access to a port or actuator on the tablet computer 24. The perimeter wall 20 may further have a plurality of access slots 40 therein. Each of the access slots 40 extends downwardly into the upper surface 27 and through adjacent ones of the interior 25 and exterior 26 surfaces. The access slots 40 facilitate further access to the tablet computer 24. One of the access slots 40 may be positioned adjacent to the first end edge 18 and one of the access slots 40 may be positioned adjacent to the first lateral edge 16. Furthermore, the panel 12 may have a camera opening 42 therein extending through the top 14 and bottom 15 sides. This will be positioned depending on location of a camera lens positioned on a backside of the tablet computer 24. The camera opening 42 will typically have a largest diameter is less than 3.0 cm and which may be less than 2.0 cm.

The top side 14 has a well 44 extending therein. A spring 45 is positioned within the well 44 and urges the tablet computer 24 upwardly away from the top side 14. This will assist a person in removing the tablet computer 24 from the panel 12. The well 44 may be placed anywhere on the panel 12, though it may be beneficial to space it away from the channel 30, such as adjacent to the second lateral edge 17, to avoid any sound deflection by the spring 45 or a peripheral wall of the well 44. As can be seen in FIG. 1, a depression 46 may be formed in the top side 14 between the channel 30 and the second lateral edge 17. The depression 46 may at least be partially bound the well 44. The depression 46 is spaced from the channel 30 by a dividing wall 47 and reduces the overall weight of the assembly 10 by removing excess material.

A plurality of finger slots 48 extends into the bottom side 15 of the panel 12. The finger slots 48 are elongated and provide for a gripping location should a user of the assembly 10 decide to hold the panel 12 in their hands. At least one of the finger slots 48 may be positioned adjacent to and extend along the first end edge 18 and another one of the finger slots 48 may be positioned adjacent to and extending along the second end edge 19.

A plurality of brackets 49, 50 is attached to the perimeter wall 20 for releasably retaining the tablet computer 24 in the receiving space 22 and in abutment with the top side 14. More particularly, at least a pair of brackets 49, 50 is attached to the perimeter wall 20 and extends over the top side 14. One of the brackets 49 may be fixed and non-movable so that the tablet computer 24 is extendable or slid under this fixed bracket 49. One of the brackets 50 may be movable between a locking position extending over the receiving space 22 and a release position positioned away from the receiving space 22. The movable bracket 50 is positioned on fasteners 51 extending through slots 52 in the movable bracket 50 to allow the movable bracket 50 to slide relative to the fasteners 51. The brackets 49, 50 may be positioned where needed or convenient for usage of the tablet computer 24. For instance, one of the brackets 49 may be positioned adjacent to the first lateral edge 16 and one of the brackets 50 may positioned adjacent to the second lateral edge 17.

As shown in FIGS. 8-14, a covering 55 may be provided. For clarity, the panel 12 and perimeter wall 20 combination will be defined as a tablet computer receiver 56 for these Figures. The covering 55 includes a back cover 57, a front cover 58 and a medial section 59 attached to and positioned between the front 58 and back 57 covers. The medial section 59 is pivotable with respect to the front 58 and back 57 covers to facilitate closing or opening of the covering 55. The back cover 57 and the front cover 58 each have an inner surface 60 and an outer surface 61. The inner surfaces 60 face each other when the covering 55 is in the closed position. The sizes of the front 58 and back 57 covers will be such that they will be able to completely cover the top 14 and bottom 15 sides of the tablet computer receiver 56. Typically the tablet computer 24 will have a width between 5.0 inches and 9.0 inches, a height between 7.0 inches and 11.0 inches and a depth being less than 1.0 inches. The tablet computer receiver 56 will have its receiving space 22 accommodate the dimensions of the tablet computer within 0.25 inches. The thickness of the perimeter wall 20 may vary but will typically be at least 0.25 inches. The covering 55 may be comprised of any conventional material but will likely be substantially rigid. The medial section 59 will be pivotable along flex joints in the material used for the covering 55 such as is typically found with a hard-covered book. For this reason, the covering 55 may be comprised of a rigid cardboard or pressed wood material covered with an outer material such as a cloth, plastic, paper, leather or synthetic materials.

A coupler 64 releasably couples the tablet computer receiver 56 to the back cover 57 such that the bottom side 15 faces the inner surface 60. The coupler 64 is mechanical and in particular is not directed to adhesives but instead relies upon friction, latches and the like to retain the tablet computer receiver 56 on the covering 55. It should be understood that the orientation of the tablet computer receiver 56 may be altered as needed. Thus, it may be rotated 180° in FIG. 8 by simply reversing the coupler 64.

The coupler 64 includes a primary mount 66 that is attached to the inner surface 60 of the back cover 57. The primary mount 66 is non-removably coupled to the back cover 57. The tablet computer receiver 56 includes at least one primary female mating member 67 releasably engageable with the primary mount 66. More particularly, the primary mount 66 may be elongated and include a first end 68 and a second end 69 each comprising a male mating member. The tablet computer receiver 56 would therefore include a pair of primary female mating members 67 releasably engaging the first 68 and second 69 ends of the primary mount 66.

The coupler 64 may further provide a secondary mount 70 attached to the inner surface 60 of the back cover 57 which is also non-removably coupled to the back cover 57. The tablet computer receiver 56 includes at least one secondary female mating member 71 is releasably engageable with the secondary mount 70. More particularly, the secondary mount 70 is elongated and includes a first end 72 and a second end 73 each comprising a male mating member. The tablet computer receiver 56 includes a pair of secondary female mating members 71 releasably engaging the first 72 and second 73 ends of the secondary mount 70. The primary 66 and secondary 70 mounts are elongated along a line orientated perpendicular to a joining edge of the back cover 57 and the medial section 59.

The primary 66 and secondary 70 mounts are spaced from each other and may be positioned adjacent to opposite edges of the back cover 57 with respect to each other.

Figure 11:
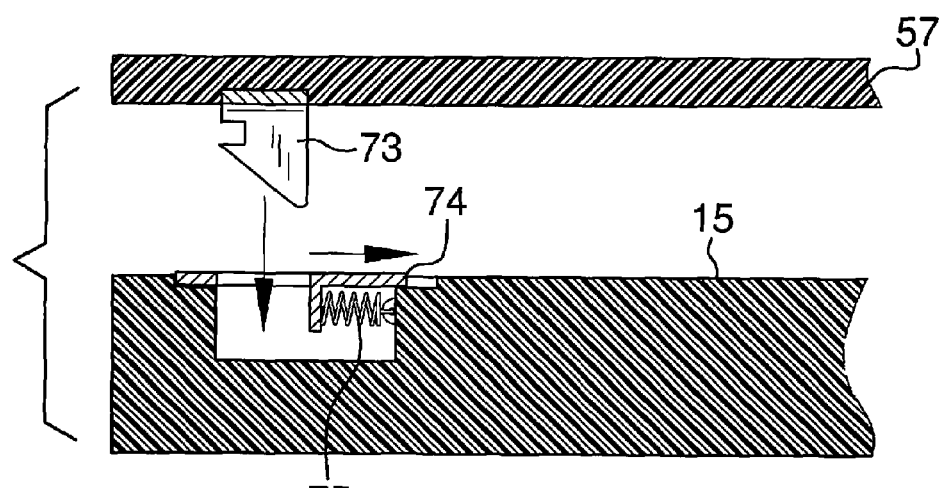
FIG. 11 is a cross-sectional view of an embodiment of the disclosure taken along line 11-11 of FIG. 10.
Figure 12:
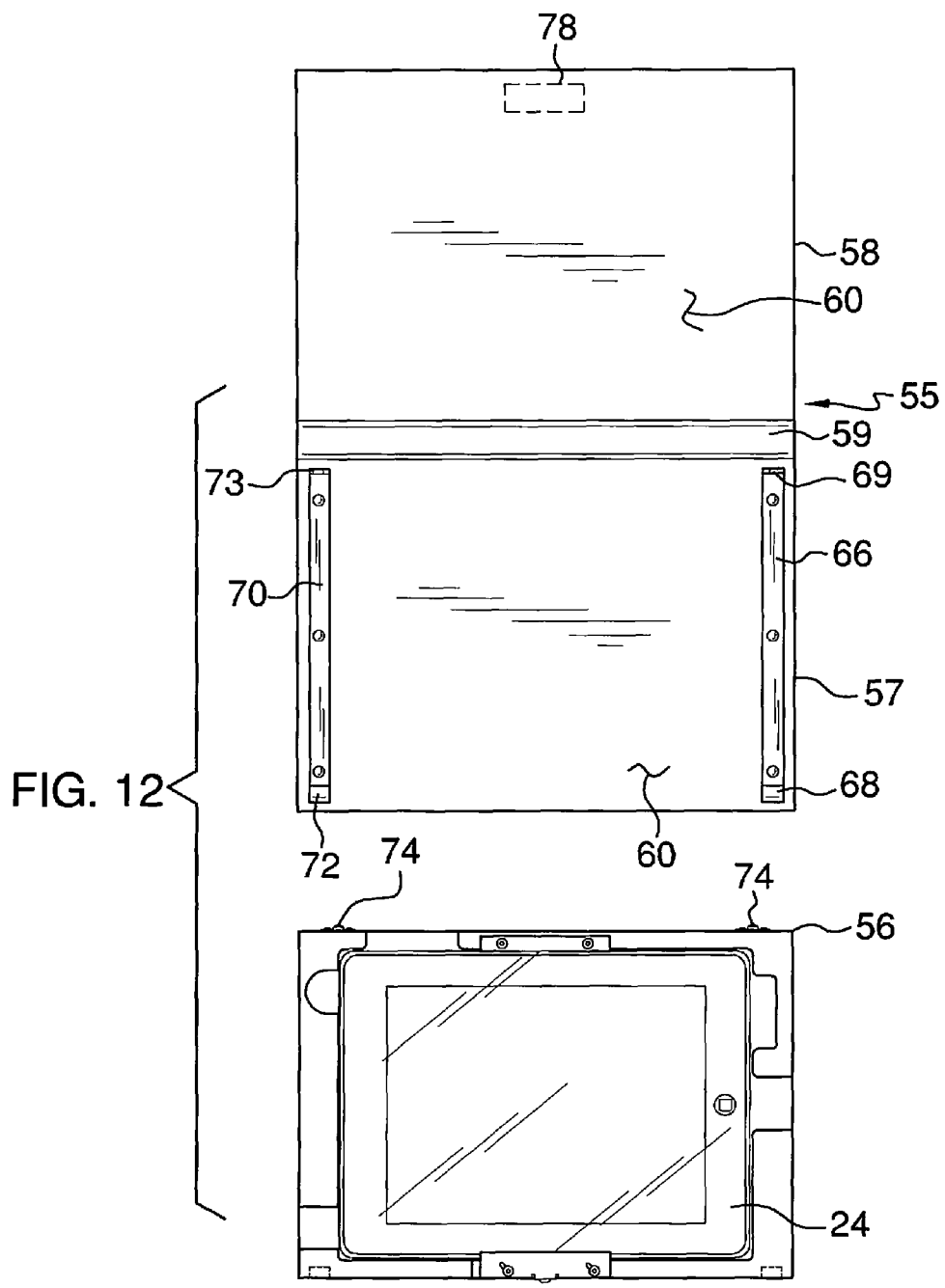
FIG. 12 is a top view of an embodiment of the disclosure.
Figure 13:
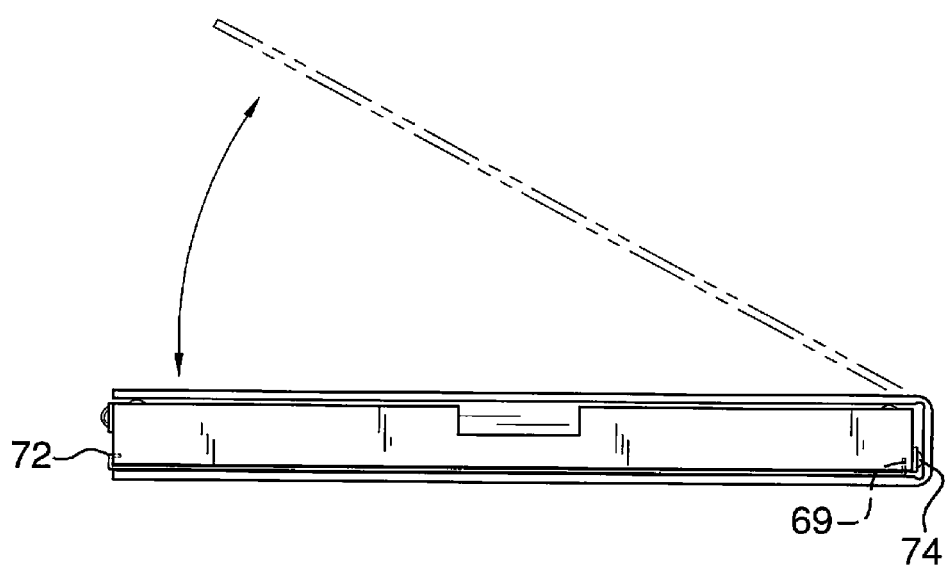
FIG. 13 is an end view of an embodiment of the disclosure.
Figure 14:
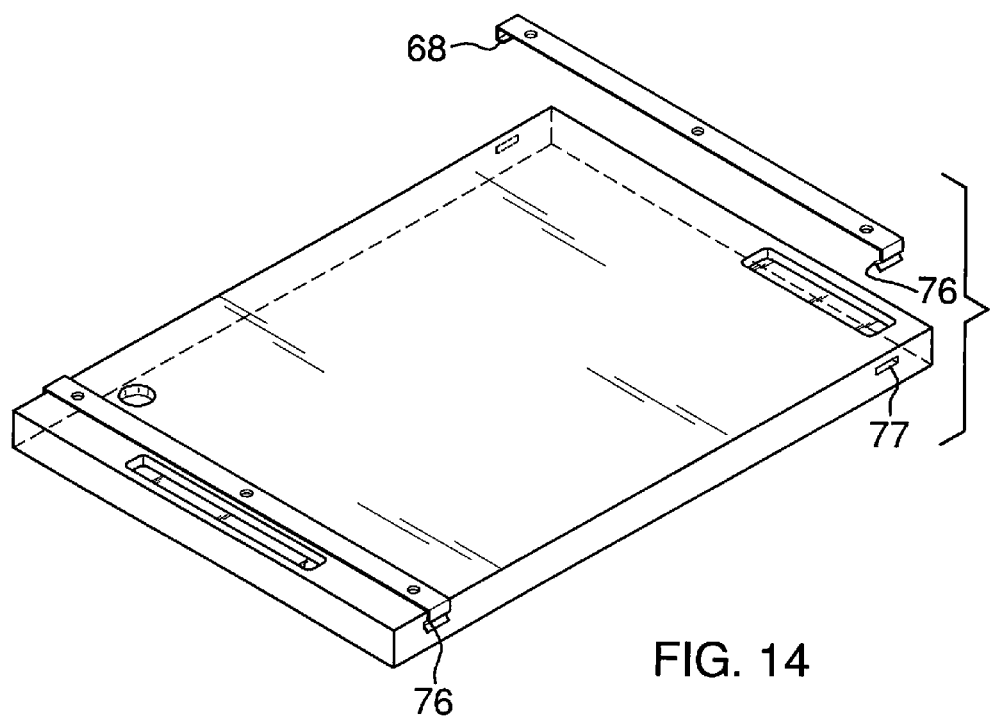
FIG. 14 is a bottom perspective view of an embodiment of the disclosure.

FIGS. 11 and 14 depict at least two different means for constructing the male and female mating members. FIG. 11, also shown in FIG. 9, includes male mating members wherein the first ends 68, 72 form a hook extendable into apertures in the perimeter wall 20 and the second ends 69, 73 is formed as a catch that is extendable into holes in the bottom side 15 and engaged with movable latches 74 including a spring 75 for retaining the latches 74 in engagement with the second ends 69, 73. FIG. 14 includes first ends 68, 72 also forming a hook, but a second end comprising a catch 76 biased toward the perimeter wall 20 to engage an indent 77 in the perimeter wall 20. The primary 66 and secondary 67 mounts are comprised of a metallic material or other rigid material what is resiliently flexible to allow the catch 76 to be pried outwardly from the indent 77.

A magnet 78 is positioned in the front cover 58. The magnet 78 is positioned to be positioned over the tablet computer 24 when the covering 55 is in the closed position. The magnet 78 signals the tablet computer 24 to enter a power saving mode since it is not viewable to the user.

In use, the tablet computer 24 is placed in the receiving space 22 and retained therein as described above. When turned on, sound emitted from the tablet computer 24 is directed outwardly through the channel and more particularly outwardly along the first 33, second 35 and third 35 arms. Moreover, the unique shape and placement of the arms 33-35 ensures that the sound volume is enhanced due to lack of extraneous sound wave collisions. It is for this reason that the channel 30 is bounded by walls having a convex curvature. The sound notches more particularly direct sound away from the panel 12 and toward a user facing the tablet computer 24. The covering 55 is used to protect the tablet computer 24 when not in use and the coupler 64 allows a person to easily remove the tablet computer receiver 56 from the covering as desired.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A sound deflecting assembly configured for removably receiving a tablet computer, said assembly comprising:
   a panel having a top side, a bottom side, a first lateral edge, a second lateral edge, a first end edge and a second end edge;
   a perimeter wall being attached to said top side and being coextensive with a perimeter edge of said panel, said perimeter wall extending around a receiving space configured for receiving a tablet computer, said perimeter wall having an interior surface, an exterior surface and an upper surface;
   said top side having a channel therein, said channel having a plurality of arms therein being in fluid communication with each other and extending from a central area of said panel and towards said perimeter wall; and
   said perimeter wall having a plurality of sound notches therein extending into said upper and interior surfaces, each of said arms being in fluid communication with one of said sound notches.

2. The sound deflecting assembly according to claim 1, wherein said panel and said perimeter wall are comprised of a wood material.

3. The sound deflecting assembly according to claim 1, wherein said plurality of arms includes a first arm, a second arm and a third arm in fluid communication with each other.

4. The sound deflecting assembly according to claim 3, wherein:
   said first arm extends toward said first end edge and being positioned nearer said first lateral edge than said second lateral edge, said plurality of sound notches including a first sound notch in fluid communication with said first arm;
   said second arm extends toward said second end edge and being positioned nearer said first lateral edge than said second lateral edge, said plurality of sound notches including a second sound notch in fluid communication with said second arm;
   said third arm extends toward said second end edge and being positioned nearer said second lateral edge than said first lateral edge, said plurality of sound notches includes a third sound notch in fluid communication with said third arm.

5. The sound deflecting assembly according to claim 4, wherein said third sound notch extends through said exterior surface.

6. The sound deflecting assembly according to claim 3, wherein said plurality of arms consists of only said first, second and third arms.

7. The sound deflecting assembly according to claim 1, wherein said perimeter wall has a plurality of access slots therein, each of said access slots extending downwardly into said upper surface and through adjacent ones of said interior and exterior surfaces, said access slots facilitating access to the tablet computer.

8. The sound deflecting assembly according to claim 1, wherein one of said access slots is positioned adjacent to said first end edge and one of said access slots is positioned adjacent to said first lateral edge.

9. The sound deflecting assembly according to claim 1, wherein said panel has a camera opening therein extending through said top and bottom sides, said camera opening having a largest diameter being less than 3.0 cm.

10. The sound deflecting assembly according to claim 1, wherein said top side has a well extending therein, a spring being positioned within said well, said spring urging the tablet computer upwardly away from said top side.

11. The sound deflecting assembly according to claim 1, further including a plurality of finger slots extending into said bottom side of said panel, said finger slots being elongated.

12. The sound deflecting assembly according to claim 11, wherein at least one of said finger slots is positioned adjacent to and extending along said first end edge and at least one of said finger is being positioned adjacent to and extending along said second end edge.

13. The sound deflecting assembly according to claim 1, further including a pair of brackets being attached to said perimeter wall and extending over said top side, said brackets releasably retaining the tablet computer in abutment with said top side.

14. The sound deflecting assembly according to claim 13, wherein one of said brackets is fixed and non-movable, one of said brackets being movable between a locking position extending over said receiving space and a release position positioned away from said receiving space.

15. The sound deflecting assembly according to claim 14, wherein one of said brackets is positioned adjacent to said first lateral edge and one of said brackets being positioned adjacent to said second lateral edge.

16. The sound deflecting assembly according to claim 11, further including a pair of brackets being attached to said perimeter wall and extending over said top side, said brackets releasably retaining the tablet computer in abutment with said top side.

17. The sound deflecting assembly according to claim 1, further including:
- said perimeter wall having a plurality of access slots therein, each of said access slots extending downwardly into said upper surface and through adjacent ones of said interior and exterior surfaces, said access slots facilitating access to the tablet computer;
- said panel having a camera opening therein extending through said top and bottom sides, said camera opening having a largest diameter being less than 3.0 cm;
- said top side having a well extending therein, a spring being positioned within said well, said spring urging the tablet computer upwardly away from said top side;
- a plurality of finger slots extending into said bottom side of said panel, said finger slots being elongated; and
- a pair of brackets being attached to said perimeter wall and extending over said top side, said brackets releasably retaining the tablet computer in abutment with said top side.

18. A sound deflecting assembly configured for removably receiving a tablet computer, said assembly comprising:
- a panel having a top side, a bottom side, a first lateral edge, a second lateral edge, a first end edge and a second end edge;
- a perimeter wall being attached to said top side and being coextensive with a perimeter edge of said panel, said perimeter wall extending around a receiving space configured for receiving a tablet computer, said perimeter wall having an interior surface, an exterior surface and an upper surface, said panel and said perimeter wall comprising a wood material, said perimeter wall and said panel being non-removably coupled to each other;
- said top side having a channel therein, said channel including a first arm, a second arm and a third arm in fluid communication with each other and extending from a central area of said panel and towards said perimeter wall;
- said first arm extending toward said first end edge and being positioned nearer said first lateral edge than said second lateral edge, said perimeter wall having a first sound notch therein in fluid communication with said first arm and extending into said interior and upper surfaces;
- said second arm extending toward said second end edge and being positioned nearer said first lateral edge than said second lateral edge, said perimeter wall having a second sound notch therein in fluid communication with said second arm and extending into said interior and upper surfaces;
- said third arm extending toward said second end edge and being positioned nearer said second lateral edge than said first lateral edge, said perimeter wall having a third sound notch therein in fluid communication with said third arm and extending into said interior and upper surfaces, said third sound notch extending through said exterior surface;
- said perimeter wall having a plurality of access slots therein, each of said access slots extending downwardly into said upper surface and through adjacent ones of said interior and exterior surfaces, said access slots facilitating access to the tablet computer, one of said access slots being positioned adjacent to said first end edge, one of said access slots being positioned adjacent to said first lateral edge;
- said panel having a camera opening therein extending through said top and bottom sides, said camera opening having a largest diameter being less than 3.0 cm;
- said top side having a well extending therein, a spring being positioned within said well, said spring urging the tablet computer upwardly away from said top side, said well being spaced away from said channel, said well being positioned adjacent to said second lateral edge;
- a plurality of finger slots extending into said bottom side of said panel, said finger slots being elongated, at least one of said finger slots being positioned adjacent to and extending along said first end edge, at least one of said finger slots being positioned adjacent to and extending along said second end edge; and
- a pair of brackets being attached to said perimeter wall and extending over said top side, said brackets releasably retaining the tablet computer in abutment with said top side, one of said brackets being fixed and non-movable, one of said brackets being movable between a locking position extending over said receiving space and a release position positioned away from said receiving space, one of said brackets being positioned adjacent to said first lateral edge and one of said brackets being positioned adjacent to said second lateral edge.

* * * * *